(12) United States Patent
Sankaye

(10) Patent No.: US 9,279,508 B1
(45) Date of Patent: Mar. 8, 2016

(54) INSERT FOR A FLUIDIC VALVE ASSEMBLY

(75) Inventor: Swapnil Shivling Sankaye, Yukon, OK (US)

(73) Assignee: Taylor Innovations, LLC, Oklahoma City, OK (US)

( * ) Notice: Subject to any disclaimer, the term of this patent is extended or adjusted under 35 U.S.C. 154(b) by 229 days.

(21) Appl. No.: 13/588,691

(22) Filed: Aug. 17, 2012

Related U.S. Application Data

(60) Provisional application No. 61/525,569, filed on Aug. 19, 2011.

(51) Int. Cl.
*F16K 15/06* (2006.01)
*F16K 15/02* (2006.01)

(52) U.S. Cl.
CPC ................................. *F16K 15/025* (2013.01)

(58) Field of Classification Search
CPC ............... F16K 15/063; F16K 15/025; Y10T 137/7668; Y10T 137/7923
USPC ................. 137/454.2, 454.6, 533.13, 533.15, 137/533.19, 535, 536, 538, 540, 543.19; 251/333, 362, 363, 360
See application file for complete search history.

(56) References Cited

U.S. PATENT DOCUMENTS

| | | | | |
|---|---|---|---|---|
| 3,411,530 A | * | 11/1968 | Powell | 137/475 |
| 3,482,415 A | * | 12/1969 | Trask | 62/222 |
| 3,848,632 A | * | 11/1974 | Powell | 137/514 |
| 4,040,442 A | * | 8/1977 | Alexandre | 137/543.17 |
| 4,190,073 A | * | 2/1980 | Claycomb | 137/238 |
| 4,245,667 A | * | 1/1981 | Braukmann | 137/493 |
| 4,530,373 A | * | 7/1985 | Bork et al. | 137/516.29 |
| 5,553,638 A | | 9/1996 | Home | |
| 6,571,822 B2 | * | 6/2003 | Neugebauer et al. | 137/538 |
| 7,568,497 B1 | | 8/2009 | Langenfeld et al. | |
| 7,631,656 B2 | | 12/2009 | Hoffman et al. | |

* cited by examiner

*Primary Examiner* — Kevin Lee
*Assistant Examiner* — P. Macade Nichols
(74) *Attorney, Agent, or Firm* — Hall Estill Attorneys at Law

(57) ABSTRACT

Apparatus for controlling a pressurized fluid in a piping network, and method for making the same. In accordance with some embodiments, a substantially cylindrical body has an annular wall surrounding a central axis with opposing first and second ends and at least one pass-through aperture extending through a medial portion of the wall. An annular valve seat is nested within a first end of the body. A moveable piston is aligned within the body along the central axis, the piston having a sealing surface adapted to contactingly engage an inner annular surface of the valve seat to establish a fluidic seal. The body, valve seat and piston form a valve insert for a valve housing.

25 Claims, 4 Drawing Sheets

INSERT FOR A FLUIDIC VALVE ASSEMBLY

RELATED APPLICATIONS

The present application makes a claim of domestic priority under 35 U.S.C. §119(e) to U.S. Provisional Patent Application No. 61/525,569 filed Aug. 19, 2011.

BACKGROUND

Pressurized fluid systems are often used to transport and direct a pressurized fluid, such as liquid or gaseous state hydrocarbons, steam, water, etc., through a piping network. A variety of valve configurations can be used to direct and condition the fluidic flow through the system, such as pressure relief valves, emergency shutdown valves, blowdown valves, flapper valves, ball valves, pressure reducing valves (chokes), back pressure valves, pressure regulating valves, etc.

SUMMARY

Various embodiments of the present disclosure are generally directed to an apparatus for controlling a pressurized fluid in a piping network, and a method for making the same.

In accordance with some embodiments, a substantially cylindrical body has an annular wall surrounding a central axis with opposing first and second ends and at least one pass-through aperture extending through a medial portion of the wall. An annular valve seat is nested within a first end of the body. A moveable piston is aligned within the body along the central axis, the piston having a sealing surface adapted to contactingly engage an inner annular surface of the valve seat to establish a fluidic seal. The body, valve seat and piston form a valve insert for a valve housing.

These and various other features and advantages of the various embodiments disclosed herein can be understood from a review of the following detailed description section and accompanying drawings.

DETAILED DESCRIPTION

Without limitation, various embodiments of the present disclosure are generally directed to a valve insert for use in a valve assembly, such as but not limited to a pressure relief valve. As explained below, the valve insert may be assembled and inserted into an interior chamber in a valve assembly housing. The provision of a relatively loose spacing between the valve insert and the interior sidewalls of the housing chamber allows for easy manufacture and reliable operation.

Figure 1:
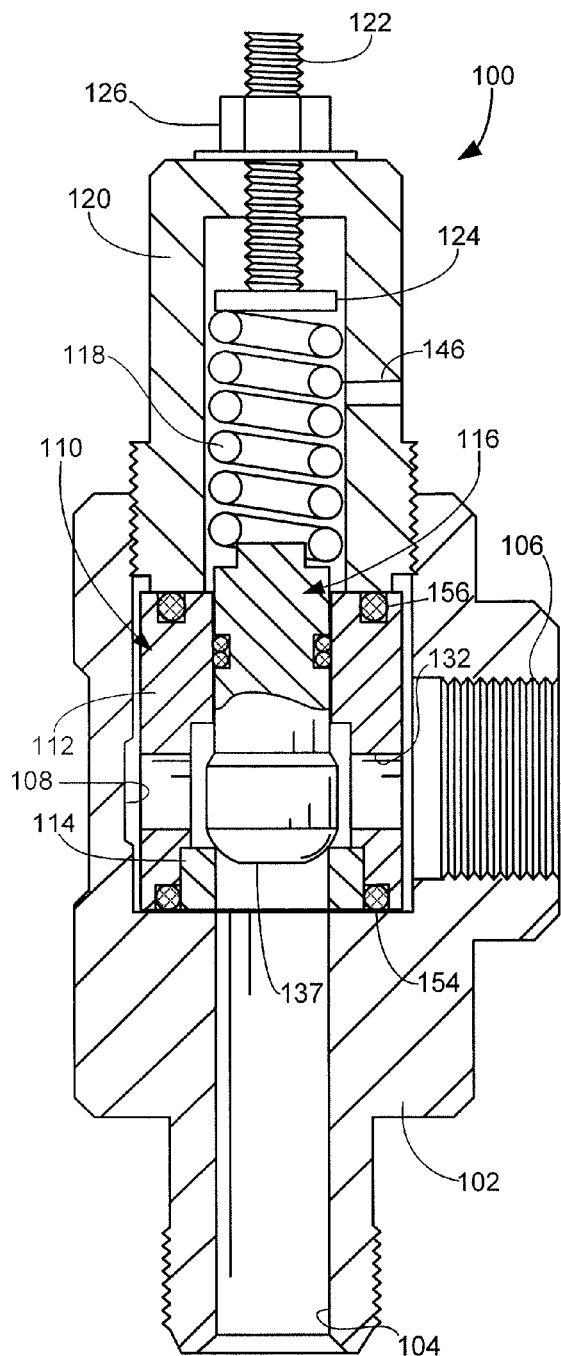
FIG. 1 shows a normally closed pressure relief valve constructed and operated in accordance with various embodiments.

FIG. 1 shows a cross-sectional elevational representation of an exemplary valve assembly 100, characterized without limitation as a normally closed pressure relief valve. The valve 100 includes a rigid housing 102 with an inlet port 104 and an outlet port 106. A medial chamber 107 is formed by an annular interior sidewall 108, with the medial chamber being in fluidic communication between the respective inlet and outlet ports 104, 106. The valve is characterized as a "90 degree valve" or a "right angle valve" on the basis that the outlet port 106 extends in a direction that is nominally 90 degrees with respect to the inlet port 104.

A valve insert is generally denoted at 110. The valve insert 110 is a self-contained, removably replaceable operational module. During manufacturing, the valve insert 110 can be assembled in a separate subassembly operation, and thereafter placed into the interior chamber 107 of the housing 102. Valve inserts with different configurations can be respectively placed into the same housing.

The valve insert 110 includes a cylindrical body portion 112, a cylindrical valve seat 114, and a piston 116 slideable within the body portion 112. A biasing member 118, such as a coiled spring, maintains the piston 116 against the valve seat 114 to form a normally closed seal interface. The seal interface may be metal-to-metal, although other materials may be used as desired.

A cap member 120 threadingly engages the housing 102 to enclose a threaded shaft 122, which extends through a distal end of the cap member 120. An interior flange 124 presses against the biasing member (spring) 118 to set a desired preload biasing force on the piston 116. An exterior threaded nut 126 can be used to maintain this preload force.

Figure 2:
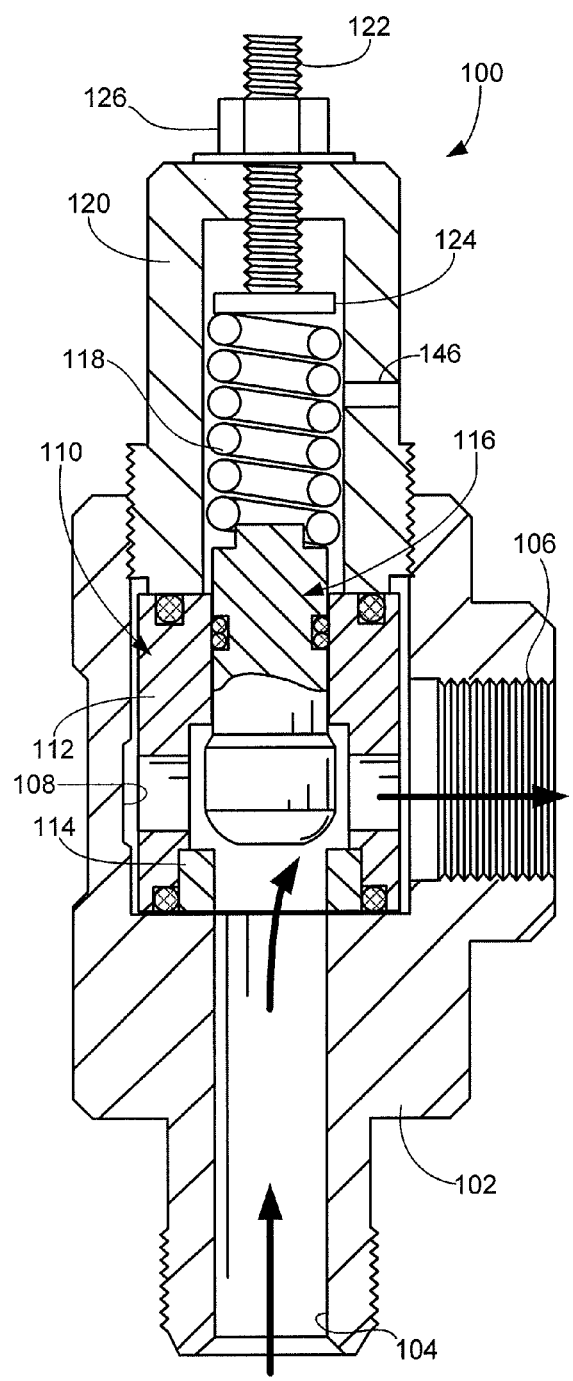
FIG. 2 shows the valve of FIG. 1 in an open position.

When the pressure of a pressurized fluid at the inlet port 104 reaches a predetermined threshold sufficient to overcome the preload bias force, the piston 116 is axially displaced upwardly as shown in FIG. 2, facilitating a flow of the pressurized fluid from the inlet port, through the medial chamber and the insert 110 to the outlet port 106. When the pressure of the fluid is subsequently reduced, the spring 118 will reseat the piston 116 onto the valve seat 114 and the valve 100 will return to the normally closed position of FIG. 1.

Figure 3A:
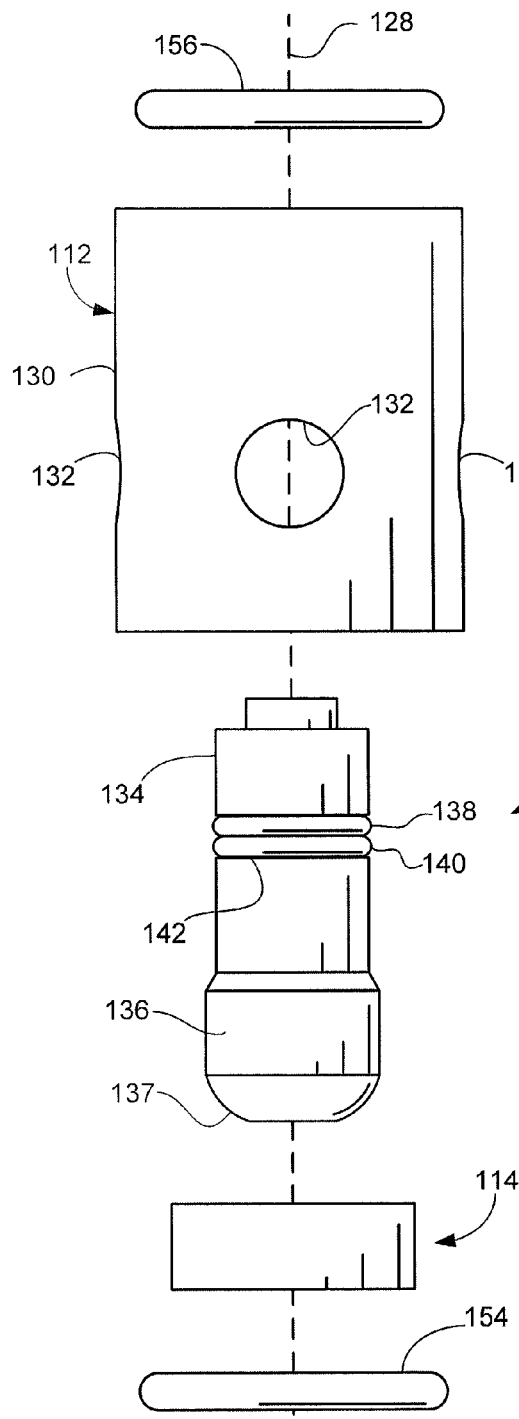
FIGS. 3A-3B are isometric and cross-sectional exploded views of a valve insert of the valve of FIGS. 1 and 2.
Figure 3B:
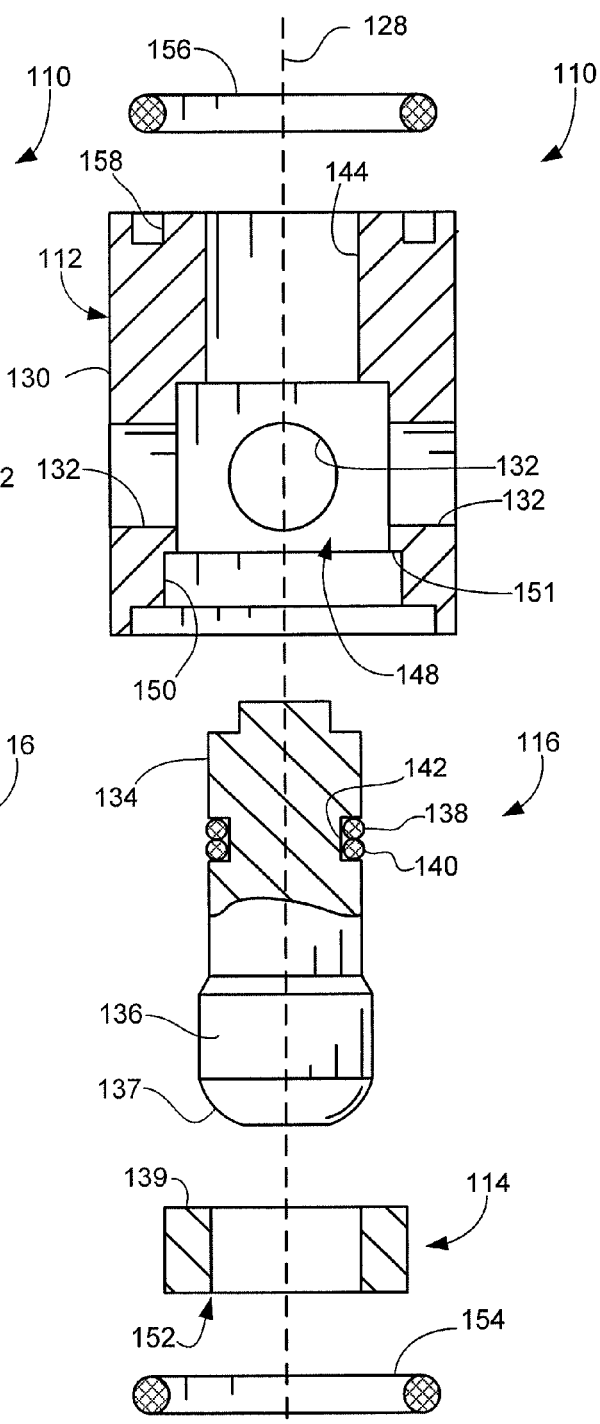

FIGS. 3A-3B show respective exploded views of the valve insert 110 of FIGS. 1-2 in accordance with some embodiments. FIG. 3A is an isometric depiction of the insert, and FIG. 3B is a cross-sectional depiction of the insert. The relative orientation of the various components can correspond to the direction of assembly of the respective components along a central axis 128.

The body portion 112 has an outer cylindrical surface 130 through which a series of apertures 132 are arranged. Four (4) equally spaced apertures 132 are depicted in FIGS. 3A-3B, although different numbers and spacings of apertures can be provided. While the apertures are circular in cross-sectional shape, this is merely exemplary as any suitable shape or shapes can be used.

The piston 116 includes a piston stem (shaft) 134 at a first end and a piston head 136 with a curvilinearly shaped sealing surface 137 at an opposing second end. The surface 137 is adapted to provide a bubble tight seal against the upper interior corner surface 139 of the valve insert 114. The respective shapes and material configurations of these surfaces can be adapted desired to effect a seal.

A pair of adjacent annular sealing members 138, 140, such as elastomeric o-rings, can be disposed in an annular groove 142 along the piston stem 134. The sealing members 138, 140 form a fluidic seal against an interior annular sidewall 144 of the body portion 112 so that the sealing members 138, 140 seal off the interior of the cap member 120 as depicted in FIGS. 1-2. Other sealing configurations can be used, including a single o-ring or other forms of sealing members.

The cap member 120 is vented using a vent aperture 146 so that the interior of the cap member is continuously maintained at the same pressure as the surrounding external atmosphere. This provides a balanced valve configuration for the valve assembly 100 in FIGS. 1-2. In a balanced pressure mode of operation, the valve 100 will open when the upwardly directed inlet pressure upon the exposed piston surface 137 provides a force that overcomes the downwardly directed bias force of the spring 118.

The opening setpoint pressure will be substantially independent of the downstream pressure at outlet port 106, and will instead be substantially governed by the magnitude of the inlet pressure. More specifically, the opening force F upon the piston 116 will be a function of the pressure P of the inlet fluid and the amount of exposed area A of the piston (F=P·A). Providing a larger or smaller exposed piston area will thus provide different opening forces for the same inlet fluid pressure, and the spring can be empirically set to allow the piston to become unseated when the desired inlet pressure level is reached.

Figure 4:
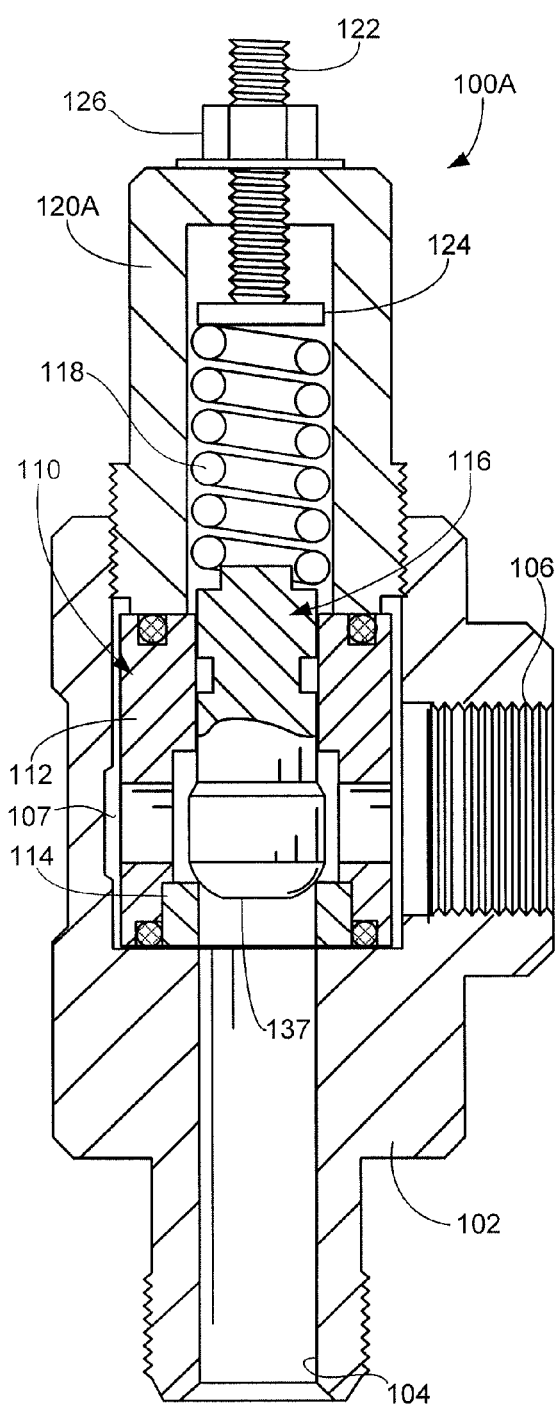
FIG. 4 depicts an alternative pressure relief valve configured as a pressure differential valve.

The valve assembly can be modified to operate as a differential pressure valve, as depicted at 100A in FIG. 4. The differential pressure valve 100A is substantially identical to the balanced pressure valve 100, except that the differential pressure valve 100A omits the sealing members 138, 140 and uses an alternative cap member 120A without the vent aperture 146 so that the interior of the cap member is hermetically sealed with respect to the surrounding external atmosphere.

The differential pressure valve 100A operates in response to the pressure differential, or relative difference, between the inlet pressure at port 104 and the outlet pressure at port 106. In a differential pressure mode of operation, the valve 100A will open when the difference in these pressures is sufficient to provide an upwardly directed force upon the exposed piston surface 137 that overcomes the combined downwardly directed bias force from the spring 118 and the downwardly directed force upon the piston 136 from the downstream pressurized fluid adjacent port 106.

In both the balanced pressure and differential pressure modes of operation, the piston head 136 reciprocates between the closed (sealed) and open (flow) positions within a central chamber of the body portion 112 defined by an annular interior sidewall 148. A second annular sidewall 150 in the body portion 112 is recessed from the sidewall 148 to form a second chamber with a shoulder surface 151 therebetween. The second chamber accommodates sliding insertion of the cylindrical valve seat 114. The valve seat 114 is reversible, so that both upper internal corner surface 139 and lower internal corner surface 152 can be alternatively used as a valve seat to form a bubble tight seal, depending on the insertion orientation of the valve seat 114.

The valve insert 110 can be quickly and easily assembled either manually or via automated assembly methods without the need for special tooling or fasteners. With reference again to FIGS. 3A-3B, during manufacture the piston 116 is slidingly inserted upwardly into the body portion 112, followed by insertion of the valve seat 114 against the annular sidewall 150. An annular sealing member 154, such as an elastomeric o-ring, can be fitted into a gap between the insert 114 and the body portion 112, as shown in FIGS. 1-2 and 4. A second annular sealing member 156, also preferably characterized as an elastomeric o-ring, can be inserted into an annular groove (channel) 158 in an upper end of the body portion 112.

Figure 5:
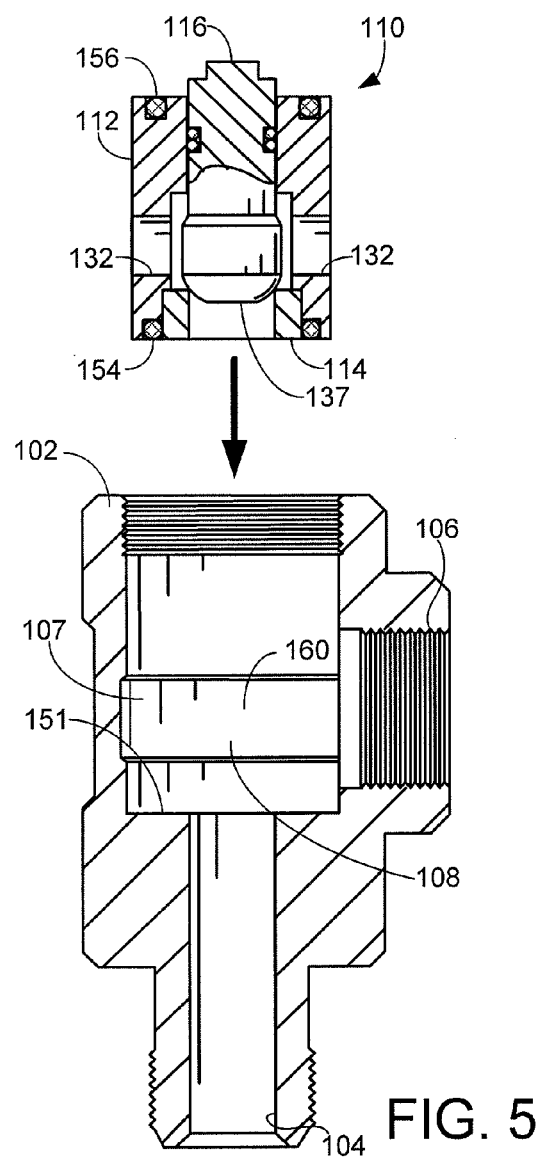
FIG. 5 illustrates insertion of the valve insert of FIGS. 3A-3B into a housing of the valve of FIGS. 1-2.

Once assembled, the valve insert 110 is dropped or otherwise placed into the medial chamber of the valve housing 102, as generally depicted in FIG. 5. The sidewall 108 includes a central annular recessed surface 160 which provides an annular channel 107 to facilitate the flow of fluid through apertures 132 and between the outer surface of the body portion 112 and the inner sidewalls 108, 160.

The chamber is larger in diameter than the outermost diameter of the valve insert 110 to accommodate placement of the valve insert 110. It is not necessary to precisely center the valve insert 110 within the chamber during such placement.

Once the insert 110 has been lowered into the chamber 107, the spring 118 (FIGS. 1-2 and 4) is placed onto the distal end of the piston stem 134. The threaded shaft 122 with flange 124 attached thereto is threaded upwardly into the cap member 120 through the nut 126 to provide a cap assembly. The cap assembly is lowered onto the housing so that the flange 124 engages the top of the spring 118. The cap assembly is thereafter rotated to threadingly engage the housing, and the shaft 122 is rotated to set the bias force of the spring 118.

Figure 6:
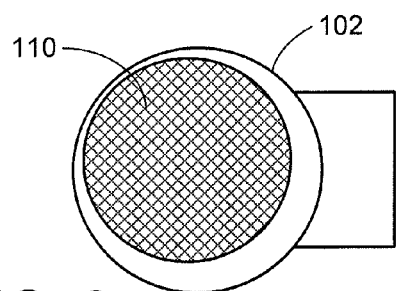
FIG. 6 is a schematic representation of axial misalignment that can be accommodated between the valve insert and the housing.

Precise centered placement of the valve insert 110 within the housing 102 is not required during assembly or subsequent operation, so long as the lower sealing member 158 establishes a fluid tight seal against the shoulder surface 151 and sufficient flow space is provided between the interior chamber wall(s) and the outer surface of the body portion 112. The valve insert 110 can accordingly be located in an offset position with respect to a central axis of the medial chamber of the housing 102, as generally represented (in exaggerated form) in the schematic depiction of FIG. 6.

It is contemplated that the valve 100 will operate reliably even if the valve insert is offset somewhat within the chamber, including in an offset position in which the outer annular wall surface of the body 112 is in physical contact with a portion of the interior chamber walls. In some embodiments, the spring 118 and flange 124 may be configured to urge the valve insert 110 to a more centered position during assembly of the completed valve.

It has been found that the foregoing valve insert subassembly and top level valve assembly manufacturing steps can be carried out in a matter of a few minutes, if not seconds, and presents a significantly easier and more reliable design over prior art valve assemblies.

Figure 7:
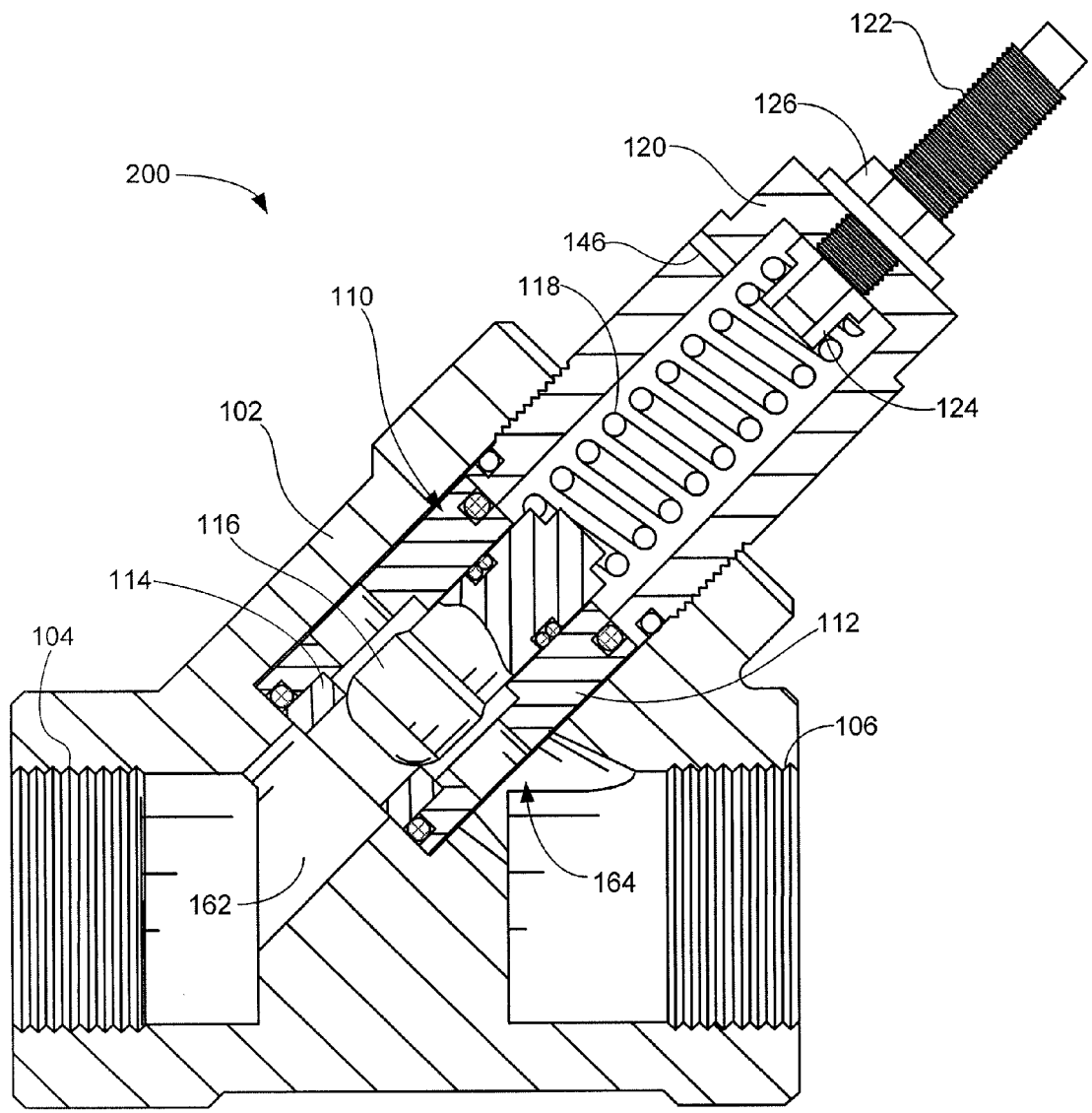
FIG. 7 depicts another normally closed pressure relief valve that uses the valve insert in accordance with various embodiments.

FIG. 7 illustrates another exemplary valve assembly 200 that uses the valve insert 110 discussed above. Unlike the 90 degree valve assemblies 100, 100A, the valve assembly 200 takes a generally in-line configuration so that the outlet port 106 is extending in the same direction as, and is aligned with, the inlet port 104.

To accommodate the in-line configuration, the fluidic flow from inlet port 104 passes up an angled inlet channel 162 to an interior chamber which accommodates the valve insert 110. With a sufficient amount of inlet pressure, the piston 116 moves away from the valve seat 114 and fluid flow through the body 112, down angled outlet channel 164 and out the outlet port 106. As with the valves 100 and 100A, the valve 200 can be given a balanced valve or a differential pressure valve configuration through the inclusion or omission of seals 138, 140 and vent aperture 146.

It will now be appreciated that the various embodiments presented herein can provide a number of benefits over the prior art. The valve insert can be quickly and easily assembled into a self-contained unit which then can be placed into a number of different housing and cap combinations to provide either pressure differential and balanced valve configurations in both in line and right angle orientations. This allows for standardized manufacturing in that a population of nominally identical valve inserts 110 can be used in a wide variety of different valve models with different configurations.

The valve design is highly modular and can be easily serviced with various parts that are replaceable in the field or in post-return processing environments. The use of a reversible annular valve seat such as the exemplary seat 114 provides the opportunity to obtain extended life because the seat 114 can be easily removed, rotated 180 degrees and then reinstalled. Various other elements such as the piston 116 and the sealing o-rings 150, 156 can also be readily replaced.

An existing valve can be converted between a balanced configuration and a differential pressure configuration by simply adding/removing the sealing members 138, 140 and changing the cap 120. In some embodiments, the valve aperture 146 can be threaded to accommodate the insertion or removal of a threaded plug (not separately shown) depending on whether balanced or differential pressure operation is desired.

Different springs (or other biasing members) can be used to provide different biasing force ranges for a given inlet/outlet diameter (e.g, 2½ inch conduits, 4 inch conduits, etc.). Similarly, different valve seats 114 with different interior diameters and the same outer diameters and thicknesses can be provided to accommodate smaller or larger interior cross-sectional flows and amounts of exposed area of the piston surface 137.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus, comprising:
a substantially cylindrical body having an annular wall surrounding a central axis with opposing first and second ends and at least one pass-through aperture extending through a medial portion of the wall;
an annular valve seat nested within a first end of the body; and
a moveable piston aligned within the body along the central axis, the piston having a sealing surface adapted to contactingly engage an inner annular surface of the valve seat to establish a fluidic seal, the body, valve seat and piston together forming a valve insert for a valve housing that is removable and installable as an intact unit; and
an annular seal member nested within the first end of the body between an outer annular surface of the valve seat and an interior annular surface of the body to sealingly engage an interior shoulder surface of the valve housing.

2. The apparatus of claim 1, in which the piston further comprises a stem extending along the central axis adjacent the second end of the body.

3. The apparatus of claim 1, in which the valve seat is a ring-shaped member having an outermost cylindrical surface which contactingly engages an inner cylindrical surface of the body, and an innermost cylindrical surface which defines a central aperture in facing relation to the sealing surface of the piston.

4. The apparatus of claim 3, in which the valve seat further comprises a top surface normal to the outermost cylindrical surface, the top surface contactingly engaging a recessed shelf surface of a body, the junction of the top surface and the innermost cylindrical surface of the valve seat forming a corner surface which contactingly engages the sealing surface of the piston in a closed position.

5. The apparatus of claim 1, in which the first end of the body has a first interior body sidewall with a first diameter sized to nestingly receive the valve seat, and the second end of the body has a second interior body sidewall with a second smaller diameter sized to nestingly receive a piston stem of the piston.

6. The apparatus of claim 1, in which the valve seat has mirrored upper and lower sealing surfaces each adapted to be alternately presented in contacting engagement against the sealing surface of the piston to form respective bubble-tight seals responsive to inversion of the valve seat relative to the body.

7. The apparatus of claim 1, the valve housing having an inlet port, an outlet port and a medial chamber in fluidic communication with the inlet and outlet ports, the medial chamber defined by an interior annular sidewall and a lower inwardly directed shoulder surface, the interior annular sidewall greater than an outermost diameter of the body to facilitate insertion of the valve insert into the medial chamber for sealing engagement against the shoulder surface.

8. The apparatus of claim 7, further comprising a cap assembly comprising a cap member adapted to engage the housing to enclose the valve insert therein and a biasing member coupled between the cap member and the piston to provide a biasing force on the piston to maintain the valve insert in a normally closed position.

9. An apparatus comprising:
a valve housing having an inlet port, an outlet port and a medial chamber in fluidic communication with the inlet and outlet ports, the medial chamber defined by an interior annular sidewall and a lower inwardly directed shoulder surface; and
a unitary valve insert removably disposable within the medial chamber, comprising:
a substantially cylindrical body comprising an annular wall with an outermost diameter less than the diameter of the interior annular sidewall of the medial chamber to form a gap therebetween, wherein at least one pass-through aperture extends through a medial portion of the wall;
an annular valve seat nested within a first end of the body;
a moveable piston disposed within the body having a sealing surface adapted to contactingly engage an inner annular surface of the valve seat to establish a fluidic seal; and
an annular seal member nested within the first end of the body between an outer annular surface of the valve seat and an interior annular surface of the body that, when the valve seal is disposed in the valve housing, sealingly engages the lower inwardly directed shoulder surface of the valve housing.

10. The apparatus of claim 9, further comprising a cap assembly comprising a cap member which sealingly engages the housing to enclose the valve insert within the medial chamber and a biasing member adapted to exert a biasing force upon the piston to maintain the piston in a normally closed position to impede a flow of pressurized fluid between the inlet and outlet ports.

11. The apparatus of claim 10, in which the cap member further comprises a vent aperture which fluidically couples the interior of the cap member with a surrounding atmospheric environment and in which the valve insert further comprises an annular sealing member disposed between the piston stem and an interior surface of the body to provide a balanced pressure mode of operation.

12. The apparatus of claim 9, in which the valve seat is a ring-shaped member having an outermost cylindrical surface which contactingly engages an inner cylindrical surface of the body, and an innermost cylindrical surface which defines a central aperture in facing relation to the sealing surface of the piston.

13. The apparatus of claim 9, in which the first end of the body has a first interior body sidewall with a first diameter sized to nestingly receive the valve seat, the second end of the body has a second interior body sidewall with a second smaller diameter sized to nestingly receive the piston stem of the piston, and a top surface of the body has a recessed sidewall to form an annular groove to accommodate a second annular sealing member.

14. The apparatus of claim 13, further comprising a threaded cap member which engages the housing to enclose the valve insert, the cap member having a lower surface adapted to sealingly engage the second annular sealing member.

15. The apparatus of claim 9, in which the valve seat has mirrored upper and lower sealing surfaces each adapted to be alternately presented in contacting engagement against the sealing surface of the piston to form respective bubble-tight seals responsive to inversion of the valve seat relative to the body.

16. The apparatus of claim 9, in which the housing has a right angle valve configuration with the outlet port aligned at nominally 90 degrees with respect to the inlet port.

17. The apparatus of claim 9, in which the housing has in in-line valve configuration with the outlet port aligned with the inlet port.

18. The apparatus of claim 9, in which the housing is a first valve housing, and the valve insert is adapted for sliding removal from the first housing and sliding insertion into a medial chamber of a different, second valve housing.

19. The apparatus of claim 9, in which the valve insert is secured within the medial chamber at a position offset from a central axis of the chamber.

20. A method comprising:
   providing a substantially cylindrical body having an annular wall surrounding a central axis with opposing first and second ends and at least one pass-through aperture extending through a medial portion of the wall;
   inserting a piston into the body, the piston having a sealing surface adjacent the first end of the body and a piston stem adjacent the second end of the body;
   placing an annular valve seat into the first end of the body, the annular valve seat having a valve seat surface adapted to contactingly engage the piston to form a bubble tight seal; and
   installing an annular sealing member between an outer annular surface of the valve seat and an interior annular surface of the body, wherein the body, piston, valve seat and sealing member form a unitary valve insert adapted for insertion as a unit into a valve housing.

21. The method of claim 20, further comprising inserting a second annular sealing member into an annular groove in a top surface of the body adjacent the second surface.

22. The method of claim 20, further comprising lowering the valve insert into an interior chamber of a valve housing.

23. The method of claim 22, further comprising installing a cap member onto the housing to enclose the valve insert within the housing.

24. The method of claim 23, further comprising placing a biasing member within the cap member to exert a biasing force upon the piston.

25. The method of claim 20, further comprising subsequently removing the valve insert from the medial chamber of the valve housing and lowering the valve insert into a second medial chamber of a differently configured, second valve housing.

* * * * *